United States Patent
Marco et al.

(10) Patent No.: US 12,425,864 B1
(45) Date of Patent: Sep. 23, 2025

(54) NETWORK SECURITY DEVICE

(71) Applicant: RubyComm Ltd, RaAnana (IL)

(72) Inventors: Shlomi Raz Marco, Alfei Menashe (IL); Yinon Feldheim, Herzliya (IL); Eric Goldberg, Rehovot (IL); Aviad Marco, Alfei Menashe (IL); Yaacov Fenster, Petach-Tikva (IL)

(73) Assignee: RubyComm Ltd, RaAnana (IL)

( * ) Notice: Subject to any disclaimer, the term of this patent is extended or adjusted under 35 U.S.C. 154(b) by 0 days.

(21) Appl. No.: 18/783,573

(22) Filed: Jul. 25, 2024

(51) Int. Cl.
*G06F 11/00* (2006.01)
*G06F 12/14* (2006.01)
*G06F 12/16* (2006.01)
*H04W 12/122* (2021.01)

(52) U.S. Cl.
CPC .................. *H04W 12/122* (2021.01)

(58) Field of Classification Search
CPC .................................... H04W 12/122
USPC .......................................................... 726/23
See application file for complete search history.

(56) References Cited

U.S. PATENT DOCUMENTS

| | | | | |
|---|---|---|---|---|
| 2014/0015673 A1* | 1/2014 | Soffer | ................. | G06F 13/4068 340/568.1 |
| 2014/0310430 A1* | 10/2014 | Geddes | ................. | G06F 13/385 710/313 |
| 2018/0225230 A1* | 8/2018 | Litichever | ................ | G06F 21/56 |
| 2019/0159000 A1* | 5/2019 | Ilami | .................. | G06Q 30/0251 |

* cited by examiner

*Primary Examiner* — Jeffrey C Pwu
*Assistant Examiner* — Samuel Ambaye (57) ABSTRACT

There is provided a peripheral device for providing network security to a host device, comprising: a network interface configured for connecting to a wireless network, a data interface configured for connecting to the host device, at least one processor executing a code for monitoring and/or analyzing data received over the network interface destined to the host device, and performing a security related action according to the monitoring and/or analysis for providing network security to the host device, and at least one peripheral service component configured for providing a peripheral service to the host device simultaneously with providing the network security.

27 Claims, 3 Drawing Sheets

NETWORK SECURITY DEVICE

BACKGROUND

The present invention, in some embodiments thereof, relates to network security devices and, more specifically, but not exclusively, to systems and methods for using a network security device for providing network security to a host device connected to a network.

Network security is challenging. A connection to a network by a computing device (e.g., desktop, laptop, and mobile device) opens up a security risk to the computing device. For example, malware and computer viruses may access the computing device over the network connection. In another example, a human hacker may obtain access to the computing device over the network connection.

SUMMARY

According to a first aspect, a peripheral device for providing network security to a host device, comprises: a network interface configured for connecting to a wireless network, a data interface configured for connecting to the host device, at least one processor executing a code for monitoring and/or analyzing data received over the network interface destined to the host device, and performing a security related action according to the monitoring and/or analysis for providing network security to the host device, and at least one peripheral service component configured for providing a peripheral service to the host device simultaneously with providing the network security.

According to a second aspect, a method for providing network security to a host device, comprising: using a peripheral device for providing a peripheral service to the host device, and simultaneously with the peripheral service: connecting to a wireless network, connecting to the host device, monitoring and/or analyzing data received from the wireless network destined to the host device, and performing a security related action according to the monitoring and/or analysis for providing network security to the host device.

In a further implementation form of the first and second aspects, wherein the at least one peripheral service component comprises: at least one interactive element configured for generating data according to interactions by a user, and a second data interface configured for communicating the data generated according to interactions by the user to the host device.

In a further implementation form of the first and second aspects, the peripheral device is implemented as a mouse, wherein the at least one interactive element comprises a housing of the mouse configured for being moved by the user, and the second data interface communicates an indication of movement of the mouse to the host device.

In a further implementation form of the first and second aspects, the peripheral device is implemented as a keyboard, wherein the at least one interactive element comprises a plurality of keys of the keyboard configured for being pressed by the user, and the second data interface communicates an indication of which key is pressed.

In a further implementation form of the first and second aspects, the peripheral device is implemented as a battery charger, wherein the peripheral services comprises charging a battery of the host device simultaneously with providing the network security to the host device.

In a further implementation form of the first and second aspects, the at least one processor executes a code for instructing the host device to select a target wireless network as the data interface installed within the host device, in response to connecting to the peripheral device for obtaining the peripheral service.

In a further implementation form of the first and second aspects, the at least one processor executes a code for instructing the host device in response to establishing providing of the peripheral service to the host device, to: de-activate a network interface installed within the host device configured for accessing a wireless network, activate a data interface installed within the host device configured for accessing the data interface of the peripheral device, and routing data for communication with the wireless network through the data interface installed within the host device, for communication with the wireless network via the network interface installed within the peripheral device.

In a further implementation form of the first and second aspects, the analyzing comprises detecting a security threat, and the security related action comprises blocking transmission of the analyzed data to the host device over the data interface.

In a further implementation form of the first and second aspects, the peripheral service is maintained simultaneously with the blocking.

In a further implementation form of the first and second aspects, the analyzing comprises detecting a security threat, and the security related action comprises blocking transmission of incoming analyzed data due to suspicious activity originating from the wireless network.

In a further implementation form of the first and second aspects, the analyzing comprises detecting a security threat, and the security related action comprises blocking transmission of incoming analyzed data due to suspicious activity originating from the host device towards the wireless network.

In a further implementation form of the first and second aspects, the analyzing comprises detecting a security threat, and the security related action comprises blocking transmission of incoming analyzed data due to suspicious infrastructure activity including at least one of: rouge routing, malicious Dynamic Host Configuration Protocol (DHCP) messages, and mal-intended services provided by the wireless network.

In a further implementation form of the first and second aspects, the analyzing comprises detecting a security threat, and the security related action comprises blocking transmission of incoming analyzed data due to insufficient security measures provided by the wireless network including at least one of: poorly implemented encryption, and known vulnerabilities present in a networking stack.

In a further implementation form of the first and second aspects, the analyzing comprises detecting a security threat, and the security related action comprises logging and exporting host device activities for further use.

In a further implementation form of the first and second aspects, the network interface, the data interface, the at least one processor, and the at least one peripheral service component, are installed and/or integrated within a single housing of the peripheral device.

In a further implementation form of the first and second aspects, the data interface comprises a physical connection interface for connect to the host device via a cable.

In a further implementation form of the first and second aspects, the security related action is selected from: a firewall service, intrusion detection, encrypted domain name service (DNS), and secure authentication for protecting the host device from unauthorized access.

In a further implementation form of the first and second aspects, the peripheral device is further configured for providing a secure connection directly to the host device.

In a further implementation form of the first and second aspects, the secure connection to the host device is selected from: mesh virtual private network, and point to point virtual private network.

In a further implementation form of the first and second aspects, further comprising a power input element configured for receiving power from a cable connected to the host device for powering the at least one processor, and the network interface, and the data interface, when the host device is in a power-on state.

In a further implementation form of the first and second aspects, the network interface is configured for connecting to a plurality of host devices, and the at least one processor executes the code for analyzing data received over the network interface destined to the plurality of host devices, and performing the security related action for providing security to the plurality of host devices.

In a further implementation form of the first and second aspects, the at least one processor is further configured for executing a code for performing a second security related action on data received from the host and sent over the wireless network.

In a further implementation form of the first and second aspects, the second security related action is encryption of the data received from the host for transmission over the wireless network.

In a further implementation form of the first and second aspects, further comprising a first switch for manual control of turning on and off the at least one processor providing the security related action, and a second switch for turning on and off the at least one peripheral service component providing the peripheral service.

In a further implementation form of the first and second aspects, further comprising: performing a second security related action on data received from the host device and being sent over the wireless network, simultaneously with the peripheral service.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to network security devices and, more specifically, but not exclusively, to systems and methods for using a network security device for providing network security to a host device connected to a network.

An aspect of some embodiments of the present invention relates to a peripheral device for providing network security to a host device. The peripheral device is connected to the host device, and provides services to the host device. The peripheral device may implemented as, for example, a keyboard, a mouse, and a battery charger. The host device may be implemented as, for example, a desktop computer, a laptop, and a mobile device (e.g., tablet computer, smartphone). The peripheral device includes a network interface designed for connecting to a wireless network, for example, a Wi-Fi network, a cellular network, and the like. The wireless network may be, for example, a public wireless network which may be prone to attack and/or may server as a medium for attack. The peripheral device further includes a data interface designed for connecting to the host device. The data interface may be implemented as, for example, a second network interface designed for wireless communication, the same network interface designed for connecting to the wireless network which may be designed to further connect to the host device, and an interface designed for wired communication. The peripheral includes a processor(s) executing a code for, and/or circuitry designed for providing network security for data communicated over the network interface and with the host device via the data interface. The peripheral device includes components for providing a peripheral service to the host device simultaneously with providing the network security. The peripheral service is independent of (i.e., excludes) network security. Examples of components and/or peripheral services include: a user interface for providing input (e.g. mouse, keyboard, and camera), a user interface for providing output (e.g., monitor, headset), a source of power (e.g., battery, charger), a docking station, an external data storage device, and the like.

In a download path, data flows from a device (e.g., server, computing cloud, remote device), over the wireless network, to the network interface of the peripheral device. The data received via the network interface of the peripheral device is forwarded to the data interface, for transmission to the host device.

In an upload path, data originating from the host device is sent to the data interface of the peripheral device. The data received via the data interface is forwarded to the network interface of the peripheral device, and transmitted over the wireless network, such as to the device (e.g., server, computing cloud, remote device).

As a component external to the host device, the peripheral device provides a layer of network security by analyzing data communicated between the host device and the wireless network. For data received over the wireless network which may be determined as likely being malicious, the peripheral device may block the data from being sent out of the peripheral device to the host device. This may reduce risk or prevent malicious data from being sent to the host device, thereby protecting the host device from attack.

By integrating network security within the peripheral device, the amount of additional external components is reduced. Rather than implementing network security with yet another external component which is cumbersome (user needs to remember to carry it, it takes up additional space on a desk, another component to configure and connect), implementing within a peripheral device does not increase the number of components. For example, implementing the network security described herein within a mouse enables using the mouse (which is required anyways) to provide network security to the host device.

An aspect of some embodiments of the present invention relates to a method for providing network security to a host device. The method involves using a peripheral device for providing a peripheral service to the host device, and simultaneously with the peripheral service: connecting to a wireless network, connecting to the host device, monitoring and/or analyzing data received from the wireless network destined to the host device, and performing a security related action according to the monitoring and/or analysis for providing network security to the host device. Optionally, a second security related action is performed on data received from the host device and being sent over the wireless network, simultaneously with the peripheral service.

At least one embodiment described herein addresses the technical problem of security a host device connecting to a wireless network. At least one embodiment described herein improves the technology of network security, by improving security of a host device connecting to a wireless network. At least one embodiment described herein improves over prior approaches for providing security to a host device connecting to a wireless network.

At least one embodiment described herein addresses the technical problem of security a host device connecting to a wireless network without increasing a number of external components. At least one embodiment described herein improves the technology of network security, by improving security of a host device connecting to a wireless network using an existing peripheral device, without increasing the number of external components. At least one embodiment described herein improves over prior approaches for providing security to a host device connecting to a wireless network, by avoiding increasing the number of existing external components. Another component dedicated to providing network security is avoided.

The advent of ubiquitous internet connectivity exponentially increases the risks and challenges associated with maintaining network security, when a host device is connecting to wireless networks. Traditional network security solutions, while effective to a degree, often require additional hardware or software, which can be cumbersome or inconvenient for mobile users or those requiring a streamlined setup.

At least one embodiment described herein improves upon the aforementioned technical problem(s), and/or improves upon the aforementioned technical field(s), and/or improves upon the aforementioned prior approaches, by providing a peripheral device designed to connect to a host device (via a data interface) and to a wireless network (via a network interface). The peripheral device provides network security for data communicated over the network interface and with the host device via the data interface. For example, the peripheral device monitors and/or analyzes data flowing from a remote device (e.g., server, computing cloud) over the wireless network to the peripheral device, destined for the host device via the data interface of the peripheral device. In response to detecting that data received over the network interface (and destined for the host device) is likely malicious, the peripheral device may take a security action, for example, blocking transmission of the data out of the peripheral device. The peripheral device may provider other services to the host device, for example, an input interface (e.g., keyboard, mouse) and/or power supply and/or charger. Integrating security measures directly into commonly used peripherals enhances security seamlessly and/or unobtrusively.

At least one embodiment described herein provides network security by integrating a wireless security network device directly into a peripheral device (for example mouse, keyboard or laptop charger) commonly used with host devices such as computers, laptops, or mobile devices. This integration potentially offers an additional layer of external security in a convenient and/or unobtrusive and/or seamless manner, enhancing host device protection against threats on wireless networks. Host devices potentially benefit from enhanced network security without the need for additional external devices or significant changes to their usual connectivity practices.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
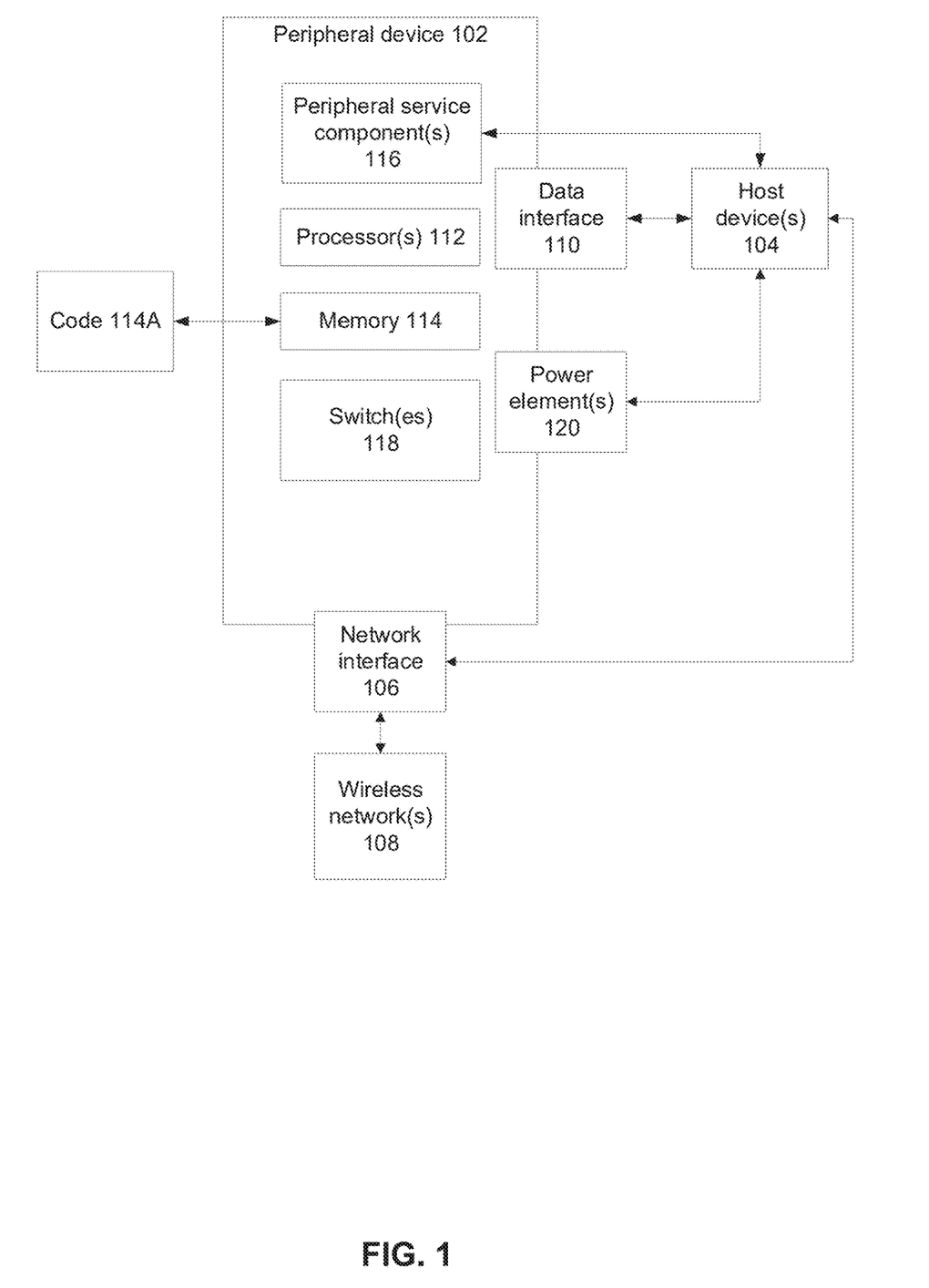
FIG. 1 is a block diagram of a peripheral device designed to provide network security to a host device 104, in accordance with some embodiments of the present invention.
Figure 2:
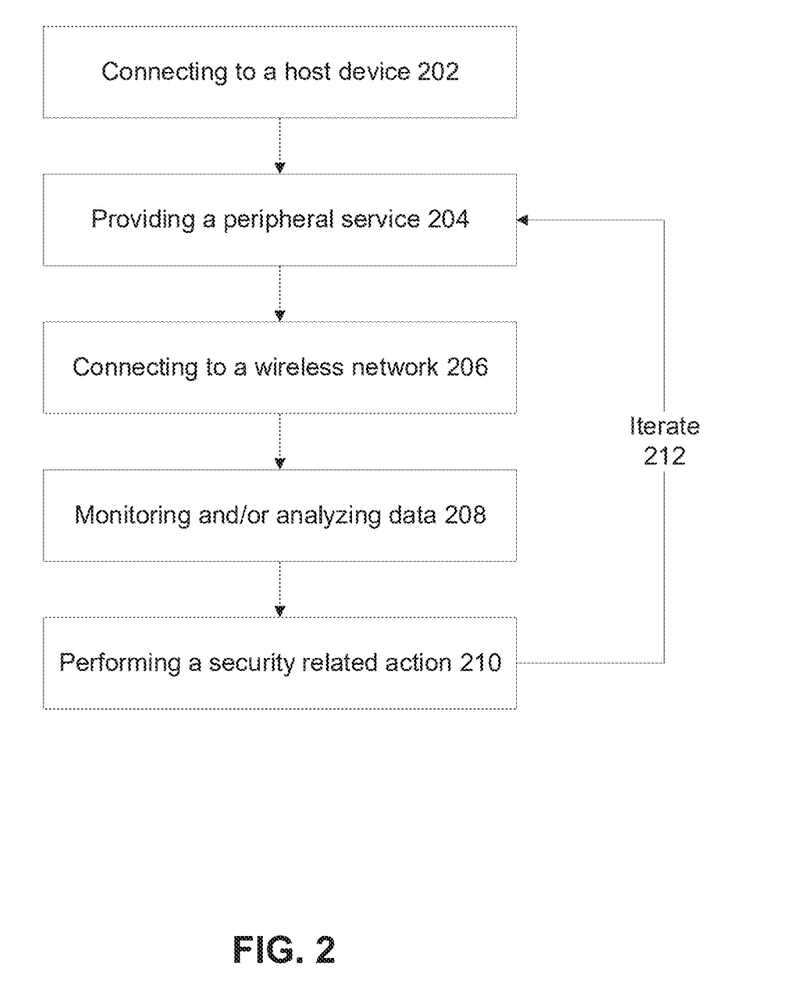
FIG. 2 is a flowchart of a method for using a peripheral device to provide network security to a host device, in accordance with some embodiments of the present invention.
Figure 3:
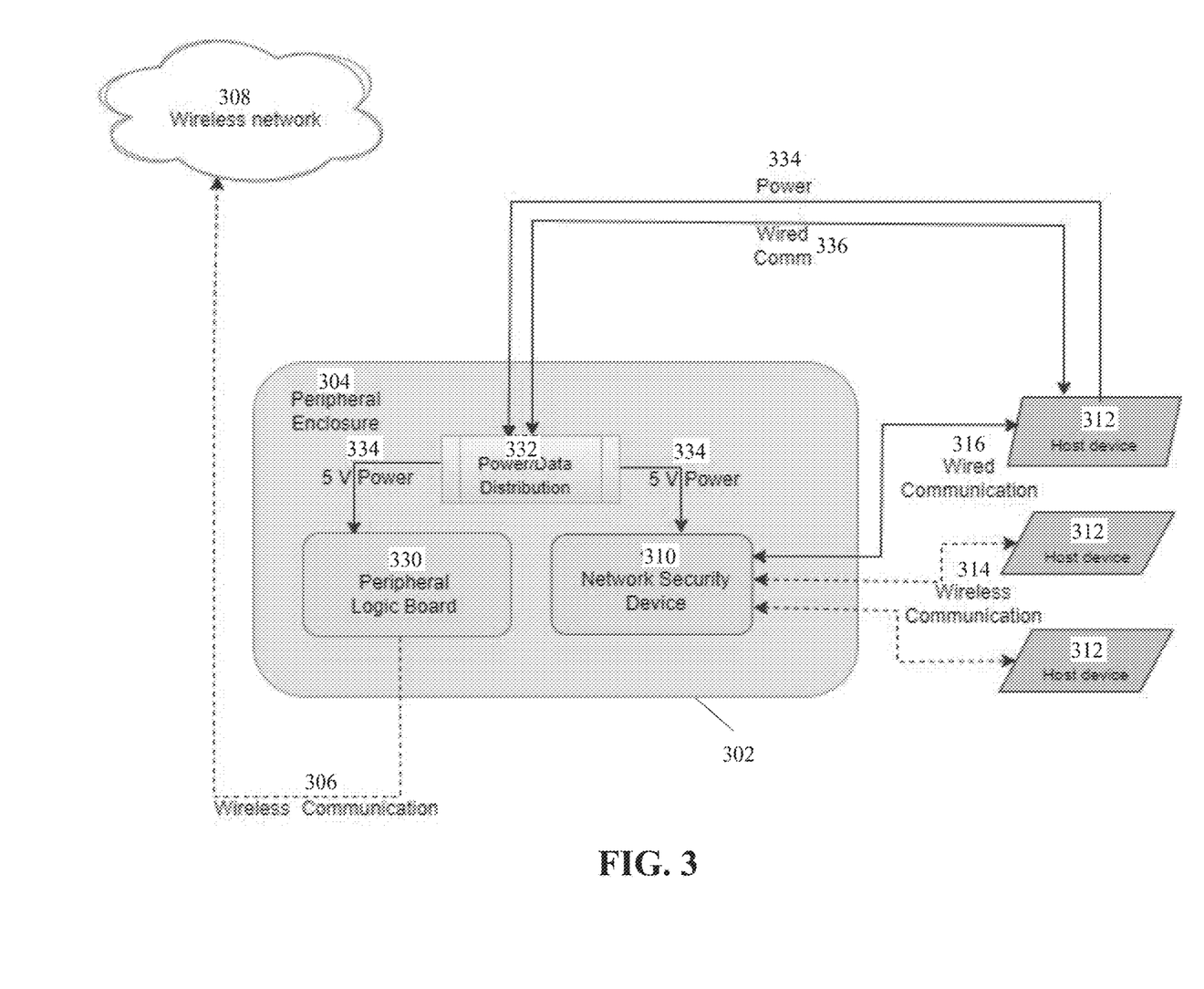
FIG. 3 is another diagram of another implementation of the peripheral device designed to provide network security to a host device, in accordance with some embodiments of the present invention.

Reference is now made to FIG. 1, which is a block diagram of a peripheral device 102 designed to provide network security to a host device 104, in accordance with some embodiments of the present invention. Reference is also made to FIG. 2, which is a flowchart of a method for using a peripheral device to provide network security to a host device, in accordance with some embodiments of the present invention. Reference is also made to FIG. 3, which is another diagram of another implementation of the peripheral device designed to provide network security to a host device, in accordance with some embodiments of the present invention.

Referring now back to FIG. 1, peripheral device 102 is designed to provide network security to one or more host devices 104. Peripheral device 102 may serve as a secure intermediary that scrutinizes and/or manages network traffic before it reaches the host device. Peripheral device 102 may act as a secure gateway for host device 104, effectively isolating host device 104 from direct exposure to wireless network(s) 108.

Examples of host devices 104 include: desktop computer, laptop, and mobile device such as a smartphone and tablet computer.

Examples of peripheral devices 102 include: mouse, trackball, vertical mouse, keyboard, monitor, printer, charger, external data storage device (e.g., hard drive, solid state device (SSD)), web camera, speakers, microphone, docking station, headset, USB hub, and the like.

Peripheral device 102 includes a network interface 106 designed for connecting to a wireless network 108. Wireless network 108 may be, for example, a local area network, Wi-Fi network, the internet, and a cellular network.

Peripheral device 102 includes a data interface 110 configured for connecting to one or more host devices 104. Optionally, data interface 110 is implemented as a physical connection interface for connect to host device 104 via a cable, for example, USB, USB-C, and Thunderbolt. Alternatively or additionally, data interface 110 is implemented for providing wireless connectivity to host device 104, for example, short range (e.g., Bluetooth), wireless network (e.g., 802.11x), and the like.

Peripheral device 102 includes one or more processors 112 providing network security. Processor(s) 112 may execute code 114A stored on a memory 114. It is noted that processor(s) 112 is a not necessarily limiting example. Other implementations may include circuitry designed to perform the network security features described herein.

Processor(s) 112 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 112 may include a single processor, or multiple processors (homogenous or heterogeneous) arranged for parallel processing, as clusters and/or as one or more multi core processing devices.

Processor(s) 112 may be compact and/or low-power.

Processor(s) 112 may execute code 114A stored on a memory 114. When executed by processor(s) 112, code 114A implements one or more features and/or acts of the method described with reference to FIG. 2.

Some exemplary features of the security service provided by peripheral device 102 include:

Monitoring data received over the network interface, which may have a destination of host device, for example, by intercepting and/or sniffing packets received via the network interface.

Analyzing data received over the network interface, which may have a destination of the host device. The analysis may be performed to determine whether the received data is likely a security threat, for example, likely malicious, malware, viruses, and/or an unauthorized attempt to remotely access the host device such as by a hacker. The analysis may be performed using suitable approaches, for example, detecting anomalous behavior (e.g., relative to historical data, relative to known anomalous behavior), matching to a template of known viruses and/or malware, detecting a signature indicative of malicious activity, and the like.

Performing a security related action. The security related action may be triggered according to the monitoring and/or analysis, for example, according to the risk of attack and/or according to the type of attack. The security related action may be for providing network security to the host device. The security related action may be automatically executed. Examples of security related actions include:

Blocking transmission of the analyzed data to the host device over the data interface.

Terminating a communication channel from the peripheral device to the host device.

Shutting down the network interface and/or data interface.

Running a malware removal and/or anti-virus process.

The security related action may be continuously provided by the processor of the peripheral device, not necessarily in response to detecting a security risk. For example:

A firewall service: Controlling and/or monitoring incoming and/or outgoing network traffic based on predetermined security rules. Establishing a barrier between a trusted internal network of the host device and untrusted external networks accessed via the wireless network. Filter network traffic by allowing or blocking data packets based on predefined security rules.

Intrusion detection: Generating an alert, such as on a display of the hots device, for example, to notify the user of the host device. The alert may be for indicating a potential security threat and/or unauthorized access attempt.

Encrypted domain name service (DNS): Encrypting DNS queries and responses. This may prevent third parties, such as ISPs or attackers, from intercepting or tampering with DNS data.

Encryption validation: Verifying that encrypted data has been correctly encrypted and can be securely decrypted by the intended recipient. The processor may perform the encryption, and/or verify encryption performed by the host device.

Secure authentication for protecting the host device from unauthorized access, malware, and/or other cyber threats: Ensuring only authorized users can access the host device. Rather than blocking all remote access attempts due to likelihood of being security risks, select remote access attempts may be allowed to continue, for example, remote access by a technician to help fix a problem on the host device, remote access by a user from another computer to obtain a file stored on the host device, and remote access by another computer to view an image stored on the host device via a shared link.

The processor of the peripheral device may instruct the host device to select a target wireless network as the data interface installed within the host device. This is to enable using the data interface of the peripheral device for accessing the wireless network (to enable security services provided by the peripheral device), rather than directly accessing the wireless network (in which the peripheral device cannot provide security services). The instructions may be automatically sent in response to connecting to the peripheral device for obtaining the peripheral service provided by the peripheral device (e.g., input from a mouse, power from a charger). For example, once the host device connected to a mouse (e.g., wirelessly, or via a cable), the peripheral device instruct the host device to then access the data interface of the mouse (to access the wireless network) rather than accessing the wireless network directly (bypassing the security provided by the mouse). It is noted that other implementations may be used, for example, code running on the host device may monitor for a successful connection to the peripheral device to obtain the peripheral service. Once the peripheral service is established, the code may instruct the host device to connect to the network of the data interface of the peripheral device (rather than directly connect to the wireless network). The code running on the host device may be downloaded by the host device from the peripheral device, and/or downloaded from a server in response to connecting to the peripheral device and/or establishing the peripheral service.

The processor of the peripheral device (and/or code running on the host device) may instruct the host device, optionally in response to establishing the peripheral service to the host device, to de-activate a network interface installed within the host device configured for accessing a wireless network. The host device may initially be directly connected to the wireless network using the network interface, such as a wireless interface. The host device may be instructed to activate a data interface installed within the host device for accessing the data interface of the peripheral device. For example, switching the selected network that the host device is connected to via the network interface, from the wireless network to the network of the data interface of the peripheral device. In another example, shutting down the wireless network interface of the host device, and activating another data interface connected to the peripheral device, such as USB interface (e.g., connected via a network cable to the peripheral device) and/or wired network port (e.g., directly connected via a network cable to the peripheral device). Data being communicated between the host device and the wireless network is routed through the data interface installed within the host device, for communication with the wireless network via the network interface installed within the peripheral device (rather than directly between the host device and wireless network).

Monitoring data originating from the host device, for sending over the wireless network (e.g., to a remote device/server). The data originating from the host device may be analyzed. A security action, which may be different than the security action performed on data received from the wireless network) may be taken accordingly. For example, encryption of data received from the host device for transmission over the wireless network. In another example, detecting an attempt to access a suspicious URL, which may be an error performed by a user clicking a fishing link in an email. In yet another example, malware that somehow made it to the host device is attempting to send data from the host device to a remote server.

Optionally, the peripheral service provided by peripheral device 102 to host device is maintained simultaneously with the security services provide by peripheral device 102. The peripheral services may be maintained even once security actions have been taken, for example, data being suspected of being related to a security risk is blocked, the network interface and/or data interface of the peripheral service has been taken down (in response to the security risk), and the like. For example, the mouse will keep on functioning as a mouse, even if an unauthorized access attempt is detected and blocked.

Optionally, peripheral device 102 is housed in a (single) housing (e.g., casing). Multiple components of peripheral device 102 may be installed and/or integrated within the (single) housing, for example, network interface 106, data interface 110, processor(s) 112, and peripheral service component(s) 116, and optionally other components described herein.

Optionally, peripheral device 102 is designed for providing a secure connection to host device 104. The secure connection may be a direct connection between peripheral device 102 and host device 104. Examples of secure connections between peripheral device 102 and host device 104 include: a mesh virtual private network, and a point to point virtual private network.

Optionally, network interface 106 may be used as an alternative to data interface 110. In such implementation, network interface 106 may be used for connecting to both host device 104 and wireless network 108.

Peripheral device 102 includes one or more peripheral service components 116 designed for providing the peripheral service to host device 104. The peripheral service and the network security features described herein are provided simultaneously by peripheral device 102.

Peripheral service component(s) 116 may include:

One or more interactive element designed for generating data according to interactions by a user, for example, a trackball and/or laser tracker and/or housing of a mouse designed to be moved by a user for indicating motion of the mouse. In another example, sensors on a keyboard indicating which keys were pressed.

Other components designed to provide data from the host device, for example, a monitor for presenting visual data received from the host device, and speakers for playing audio data received from the host device.

Yet other components designed to provide other peripheral services, for example, power/battery charger, docking station, and the like. The battery charger charges the battery of the host device simultaneously with providing the network security service to the hots device.

A data interface designed for communicating the data generated according to interactions by the user to the host device. The data interface related to the peripheral service may be different than data interface 110 related to the security service. Alternatively, data interface 110 is used for providing both security services and peripheral services.

Peripheral device 102 may include one or more switches 118 for manual control of the peripheral service and/or of the security service. Different options include:

Both security service and peripheral service are ON.
Both security service and peripheral service are OFF.
Security service is ON and peripheral service is OFF.
Security service is OFF and peripheral service is ON.
There may be different implementations, for example:
A first switch is for manual control of turning on and off processor 112 (and/or network interface 106 and/or data interface 110) providing the security services (e.g., security related action and/or other features described herein). A second switch is for manually turning on and off the peripheral service component(s) 116.

A single switch with different settings for the different states of the peripheral service and/or security service described herein.

Peripheral service 102 may include a power input element(s) 120 designed for receiving power. There may be different possible connections of power input element(s) 120, for example:

A cable connected to the host device 104 for obtaining power from host device 104. The power may be for powering components providing the security service (i.e., processor(s) 112, network interface 106, and/or data interface 110. Power may be provided when host device 104 is in a power-on state. Power may be disconnected when host device 104 is in a power-off state.

Power to peripheral service component(s) 116 for providing the peripheral service may be from another power source to maintain the peripheral service when power is disconnected from components provided the security service. This may allow the user to keep using the peripheral service for the host device even when there is a problem with the security service. For example, a user may still be able to use the keyboard even when the security service is down.

From a battery, for example, a removable battery or a built-in rechargeable battery.

From a cable connected to a wall outlet.

From a Power and DATA Distribution unit (PDD) which may be connected to processor(s) 112, implemented for example, by the use of a Micro Hub such as Micro USB hub integrated circuit.

Referring now back to FIG. 2, features of the method described with reference to FIG. 2 may be implemented by components of the peripheral device described with reference to FIG. 1 and/or FIG. 3.

At 202, a peripheral device is connected to a host device. The peripheral device may be connected for providing peripheral services simultaneously with network security services.

The connection to the host device may include two parts. A first part of connecting the peripheral service to the host device, and a second part of connecting the network security service to the host device. There may be different interfaces for the different services. For example, a cable (or short range) wireless connection to transmit data associated with the peripheral service, and a second wireless connection for enabling the host device to access a wireless network via the peripheral device providing security services.

At 204, the peripheral device provides the peripheral service to the host device. Examples of peripheral services are provided herein.

At 206, the peripheral device connects to the wireless network. The wireless network is the network to which the host device wishes to connect to via the peripheral device, rather than directly.

At 208, the peripheral device monitors and/or analyzes data. The data may be received from the wireless network destined for the host device. Alternatively or additionally, the data may be received from the host destined for the wireless network.

Exemplary approaches of monitoring and/or analyzing data are described herein.

At 210, a security related action may be performed according to the monitoring and/or analysis of data received from the wireless network. The security related action is for providing network security to the host device. Alternatively or additionally, the security related action may be performed on data received from the host device for being sent over the wireless network.

Exemplary of security related actions include:

- Blocking transmission of incoming analyzed data (i.e., arriving from the wireless network destined for the host device) due to suspicious activity originating from the wireless network
- Blocking transmission of incoming analyzed data due to suspicious activity originating from the host device towards the wireless network.
- Blocking transmission of incoming analyzed data due to suspicious infrastructure activity including. For example, rouge routing, malicious Dynamic Host Configuration Protocol (DHCP) messages, and mal-intended services provided by the wireless network.
- Blocking transmission of incoming analyzed data due to insufficient security measures provided by the wireless network, for example, poorly implemented encryption, and/or known vulnerabilities present in the networking stack.
- Logging and exporting host device activities for further use.

At 212, features described with reference to 204-210 are iterated, for simultaneously providing peripheral services and network security services to the host device. The iterations may be performed which the host device is connected to the wireless network via the peripheral device.

Referring now back to FIG. 3, components described with reference to FIG. 3 may correspond to, and/or may be integrated with, and/or may include, one or more components described with reference to FIG. 1. A peripheral device 302 may be housed in a peripheral enclosure 304 (e.g., housing). Peripheral device 302 may include a peripheral logic board 330 which is designed to establish a wireless communication 306 with a wireless network 308. Peripheral device 302 may include a network security device 310 designed to connect to one or more host devices 312 via a wireless communication 314 and/or wired communication 316. Network security device 310 provides network security services to host device(s) 312, as described herein. Peripheral device 302 may include a power/data distribution element 332 designed to provide power 334 to peripheral logic board 330 and/or network security device 310. Power/data distribution element 332 may receive power 334 from host device(s) 312, and/or may be in wired communication 336 with host device(s) 312, for example, for sending data related to the peripheral services.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant peripheral devices will be developed and the scope of the term peripheral device is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A peripheral device for providing network security to a host device, comprising:
    a first interface, being a network interface configured for connecting to a wireless network;
    a second interface, other than said first interface, and being separated from said first interface, configured for connecting to the host device;
    at least one processor executing a code for:
        monitoring and/or analyzing data received over the network interface and destined to the host device, and
        performing a security related action according to the monitoring and/or analysis for providing network security to the host device; and
    at least one peripheral service component configured for providing a peripheral service of said peripheral device to the host device, said peripheral service is provided simultaneously with providing, by the peripheral device, the network security to the host device;
    wherein the peripheral device receives, through the first interface, data flowing via said wireless network, from at least one remote device and destined to the host device, and
    wherein said peripheral device transmits said received data to said host device through the second interface, according to said monitoring and/or analyzing.

2. The peripheral device of claim 1, wherein the at least one peripheral service component comprises:
    at least one interactive element configured for generating data according to interactions by a user; and
    a second data interface configured for communicating the data generated according to interactions by the user to the host device.

3. The peripheral device of claim 2, wherein the peripheral device is implemented as a mouse, wherein the at least one interactive element comprises a housing of the mouse configured for being moved by the user, and the second data interface communicates an indication of movement of the mouse to the host device.

4. The peripheral device of claim 2, wherein the peripheral device is implemented as a keyboard, wherein the at least one interactive element comprises a plurality of keys of the keyboard configured for being pressed by the user, and the second data interface communicates an indication of which key is pressed.

5. The peripheral device of claim 1, wherein the peripheral device is implemented as a battery charger, wherein the peripheral services comprise charging a battery of the host device simultaneously with providing the network security to the host device.

6. The peripheral device of claim 1, wherein the at least one processor executes a code for instructing the host device to select a target wireless network as the data interface installed within the host device, in response to connecting to the peripheral device for obtaining the peripheral service.

7. The peripheral device of claim 1, wherein the at least one processor executes a code for instructing the host device in response to establishing providing of the peripheral service to the host device, to:
    de-activate a network interface installed within the host device configured for accessing a wireless network,
    activate a data interface installed within the host device configured for accessing the data interface of the peripheral device, and
    routing data for communication with the wireless network through the data interface installed within the host device, for communication with the wireless network via the network interface installed within the peripheral device.

8. The peripheral device of claim 1, wherein the analyzing comprises detecting a security threat, and the security related action comprises blocking transmission of the analyzed data to the host device over the data interface.

9. The peripheral device of claim 8, wherein the peripheral service is maintained simultaneously with the blocking.

10. The peripheral device of claim 1, wherein the analyzing comprises detecting a security threat, and the security related action comprises blocking transmission of incoming analyzed data due to suspicious activity originating from the wireless network.

11. The peripheral device of claim 1, wherein the analyzing comprises detecting a security threat, and the security related action comprises blocking transmission of incoming analyzed data due to suspicious activity originating from the host device towards the wireless network.

12. The peripheral device of claim 1, wherein the analyzing comprises detecting a security threat, and the security related action comprises blocking transmission of incoming analyzed data due to suspicious infrastructure activity including at least one of: rouge routing, malicious Dynamic Host Configuration Protocol (DHCP) messages, and mal-intended services provided by the wireless network.

13. The peripheral device of claim 1, wherein the analyzing comprises detecting a security threat, and the security related action comprises blocking transmission of incoming analyzed data due to insufficient security measures provided by the wireless network including at least one of: poorly implemented encryption, and known vulnerabilities present in a networking stack.

14. The peripheral device of claim 1, wherein the analyzing comprises detecting a security threat, and the security related action comprises logging and exporting host device activities for further use.

15. The peripheral device of claim 1, wherein the network interface, the data interface, the at least one processor, and the at least one peripheral service component, are installed and/or integrated within a single housing of the peripheral device.

16. The peripheral device of claim 1, wherein the data interface comprises a physical connection interface for connect to the host device via a cable.

17. The peripheral device of claim 1, wherein the security related action is selected from: a firewall service, intrusion detection, encrypted domain name service (DNS), and secure authentication for protecting the host device from unauthorized access.

18. The peripheral device of claim 1, wherein the peripheral device is further configured for providing a secure connection directly to the host device.

19. The peripheral device of claim 18, wherein the secure connection to the host device is selected from: mesh virtual private network, and point to point virtual private network.

20. The peripheral device of claim 1, further comprising a power input element configured for receiving power from a cable connected to the host device for powering the at least one processor, and the network interface, and the data interface, when the host device is in a power-on state.

21. The peripheral device of claim 1, wherein the network interface is configured for connecting to a plurality of host devices, and the at least one processor executes the code for analyzing data received over the network interface destined to the plurality of host devices, and performing the security related action for providing security to the plurality of host devices.

22. The peripheral device of claim 1, wherein the at least one processor is further configured for executing a code for performing a second security related action on data received from the host and sent over the wireless network.

23. The peripheral device of claim 22, wherein the second security related action is encryption of the data received from the host for transmission over the wireless network.

24. The peripheral device of claim 1, further comprising a first switch for manual control of turning on and off the at least one processor providing the security related action, and a second switch for turning on and off the at least one peripheral service component providing the peripheral service.

25. A method for providing network security to a host device, comprising:
using a peripheral device for providing a peripheral service to the host device, and simultaneously with providing the peripheral service to the host device, performing by the peripheral device:
connecting to a wireless network through a first interface, being a network interface;
connecting to the host device, via a second interface, other than said first interface, and being separated from said first interface, being a data interface, which is separated from the network interface;
monitoring and/or analyzing data received from the wireless network and destined to the host device, and
performing a security related action according to the monitoring and/or analysis for providing network security to the host device;
wherein the peripheral device receives, through the first interface, data flowing via said wireless network, from at least one remote device and destined to the host device, and
wherein said peripheral device transmits said received data to said host device through the second interface, according to said monitoring and/or analyzing.

26. The method of claim 25, further comprising:
performing a second security related action on data received from the host device and being sent over the wireless network, simultaneously with the peripheral service.

27. The peripheral device of claim 1, wherein the peripheral device is implemented as one of a mouse, a keyboard and a battery charger.

* * * * *